United States Patent [19]

Smith

[11] 4,063,708
[45] Dec. 20, 1977

[54] QUICK DISCONNECT DEVICE FOR FLEXIBLE TUBES

[75] Inventor: Edward M. Smith, Pike Township, Knox County, Ohio

[73] Assignee: The Gorman-Rupp Company, Mansfield, Ohio

[21] Appl. No.: 703,677

[22] Filed: July 8, 1976

[51] Int. Cl.² .................. F16L 29/00; F16L 37/28
[52] U.S. Cl. ........................ 251/149.4; 251/149.6; 285/249
[58] Field of Search ........... 251/149.4, 149.6, 149.7; 285/321, 248, 249

[56] References Cited

U.S. PATENT DOCUMENTS

| 2,086,569 | 7/1937 | Meyer | 251/149.7 |
| 2,268,020 | 12/1941 | Dahlstrom | 285/249 X |
| 2,896,971 | 7/1959 | Kolar | 251/149.7 |
| 3,368,831 | 2/1968 | Phillipps | 285/249 |
| 3,486,730 | 12/1969 | Potash | 251/149.7 |
| 3,596,933 | 8/1971 | Luckenbill | 285/249 X |

FOREIGN PATENT DOCUMENTS

| 226,448 | 5/1957 | Australia | 251/149.7 |
| 792,136 | 3/1958 | United Kingdom | 285/249 |

Primary Examiner—William R. Cline
Attorney, Agent, or Firm—Hamilton, Renner & Kenner

[57] ABSTRACT

A quick disconnect device for connecting a flexible tube to a poppet valve comprising a valve actuator inserted in the end of the tube, an outer sleeve screwed onto the valve and having an inner recess for receiving an O-ring surrounding the tube behind the valve actuator, the sleeve when tightened being adapted to constrict the O-ring on the tube and open the valve and when loosened to allow withdrawal of the tube.

12 Claims, 4 Drawing Figures

QUICK DISCONNECT DEVICE FOR FLEXIBLE TUBES

BACKGROUND OF THE INVENTION

In systems for circulating hot or cold fluids to disposable devices, as for example thermal pads for application to the human body, a flexible tube attached to the pad is coupled to a poppet valve or the like on the circulating equipment. The pad and the attached flexible tube are normally disposable items, so that when the coupling device is unscrewed from the valve it must be detached from the disposable tube for reuse. The operation of connecting and disconnecting the tube to and from the coupling device together with disconnecting the coupling device from the valve takes excessive time, and, moreover, the user is apt to carelessly throw away the relatively expensive coupling device along with the disposable tube and pad.

SUMMARY OF THE INVENTION

The present invention provides an inexpensive disposable valve actuator element to be inserted in the end of each disposable tube, with a simple coupling sleeve that remains on the valve and is tightened to constrict an O-ring to quickly connect the tube and open the valve, and is loosened to close the valve and quickly disconnect the tube for withdrawal with the disposable valve actuator therein.

It is an object of the present invention to provide an improved quick disconnect device for connecting a disposable tube to and disconnecting it from a poppet valve or the like.

Another and more specific object is to provide an improved quick disconnect device having a disposable valve actuator inserted in the end of the disposable tube.

A further object is to provide an improved quick disconnect device having a coupling sleeve screwed on the valve which forces an O-ring against the actuator to open the valve and simultaneously seals the assembly against leakage.

Another object is to provide an improved quick disconnect device in which partially unscrewing the coupling sleeve allows the valve to close and permits withdrawal of the tube and its insert without the use of tools.

DESCRIPTION OF A PREFERRED EMBODIMENT

Figure 1:
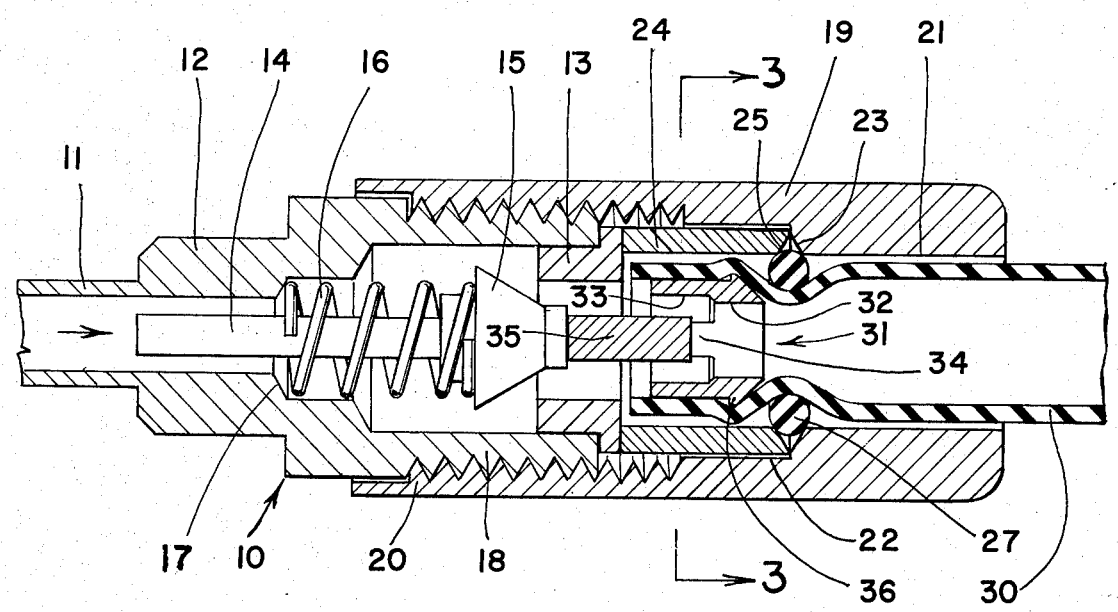
FIG. 1 is a longitudinal sectional view of the improved quick disconnect device connecting a flexible tube to a poppet valve, showing the valve open and the connection sealed.
Figure 2:
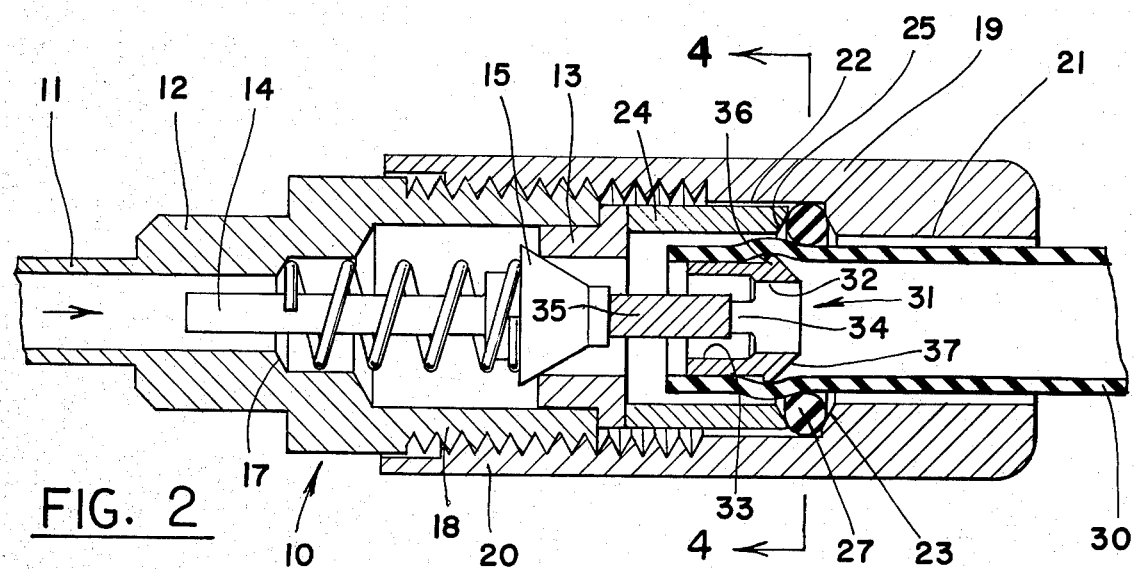
FIG. 2 is a similar view showing the valve closed and the tube partially withdrawn.
Figure 3:
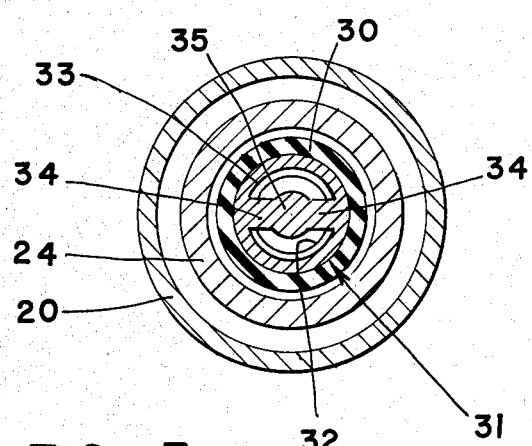
FIG. 3 is a cross sectional view on line 3—3 of FIG. 1.
Figure 4:
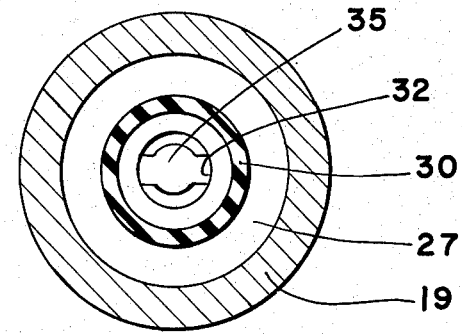
FIG. 4 is a cross-sectional view on line 4—4 of FIG. 2.

The poppet valve indicated generally at 10 is connected in a usual manner to a conduit 11 which supplies heating or cooling fluid from a pump or circulating device (not shown) in the direction of the arrow in FIGS. 1 and 2. The valve has a tubular body 12 in which an annular valve seat 13 is mounted, and an axial valve stem 14 having a tapered valve element 15 thereon is urged toward seating abutment with said seat by a helical spring 16 encircling the stem and interposed between said element 15 and a shoulder 17 in the valve body.

The valve body has an exteriorly threaded portion 18 for connection to a female coupling member, and the coupling member may be a sleeve 19 having an interiorly threaded portion 20 at one end for screwing onto the portion 18 and a cylindrical bore 21 at its other end. Preferably the outer surface of the sleeve is knurled to facilitate turning by hand.

The sleeve 19 has an inner annular recess 22 beginning at the inner end of the threaded portion 20 and terminating in a beveled shoulder 23 and a thimble tube 24 is received in said recess. The radial thickness of the thimble 24 is substantially equal to the radial depth of the recess 22, and one end of the thimble is adapted to abut the annular valve seat 13. The other end 25 of the thimble 24 facing shoulder 23 is beveled oppositely to shoulder 23 so that when the sleeve is screwed tightly onto valve body 12, as in FIG. 1, the end 25 and the shoulder 23 form an annular V-shaped channel which expands longitudinally as the sleeve is partially unscrewed, as shown in FIG. 2.

An O-ring 27, preferably having a thickness somewhat greater than the radial depth of the recess 22, is positioned in the annular channel between the beveled shoulder 23 and beveled end 25 of the thimble. The O-ring 27 in unrestrained or expanded condition has an outer diameter substantially equal to the inner diameter of the recess 22, so that when the sleeve 19 is in the loosened position of FIG. 2, the O-ring radially abuts the wall of the recess.

The end portion of a flexible disposable tube 30 to be connected to the valve 10 is inserted into the bore 21 of the sleeve. Prior to insertion, the end of the tube has inserted therein an annular valve actuator indicated generally at 31. The actuator has a bore 32 at one end communicating with a slightly larger bore 33 at the other end. Within the bore 33 is a pair of radial ribs 34 which support a central stem 35 extending axially out of the bore. Exteriorly of the bore 32 the actuator has a radially projecting annular rib 36, and a beveled annular surface 37 extends from the rib to the outer end of the bore 32.

When the sleeve 19 is in the loosened position of FIG. 2 with the O-ring radially expanded, the end of a tube 30 having an actuator 31 inserted therein can be quickly connected by inserting it into the bore 21 of sleeve 19 and sliding it through the expanded ring until the rib 36 is past the ring. The knurled sleeve 19 is then screwed tightly onto valve body 12 to bring the beveled shoulder 23 up to the beveled end 25 and form a V-shaped annular channel therebetween, causing the O-ring to be wedged or squeezed radially inward to constrict the tube against the beveled surface 37 and force the stem 35 against the spring-loaded valve element 15 to move it away from the seat 13, as shown in FIG. 1. In this position the opposite end of the thimble 24 is held in abutment with the valve seat member 13 to form a seal. In its constricted position, the O-ring 27 provides a seal against leakage between the tube and the outer assembly.

To quickly disconnect the tube one merely loosens or partially unscrews the sleeve until the annular channel between the beveled surfaces 23 and 25 is widened sufficiently to allow the O-ring to expand radially to the position of FIG. 2, and the spring 16 then will move the valve 15 to closed position, whereupon the tube 30 and the actuator 31 therein can be withdrawn and discarded, and the sleeve 19 and O-ring 27 are in position to receive another tube and actuator.

It will be seen that an improved device for quickly and easily connecting a disposable tube to and disconnecting it from a supply valve has been provided having a disposable part of minimum cost and maximum effectiveness, and the connecting and disconnecting operations are made without the use of any tools.

I claim:

1. A quick disconnect device for connecting a flexible tube to a poppet valve comprising an annular actuator inserted in the end of said tube and having a central stem at one end for engaging the valve poppet when the tube is inserted into the valve, an outer sleeve screwed onto the valve having an inner annular recess terminating in a shoulder, a thimble within said recess having one end forming an annular channel at said inner shoulder, and an O-ring for fitting within said channel surrounding said tube behind the other end of said actuator and adapted to constrict said tube and force the actuator against the valve poppet when the sleeve is tightened and to permit withdrawal of said tube when the sleeve is loosened.

2. A quick disconnect device, as described in claim 1, wherein said recess shoulder is beveled.

3. A quick disconnect device, as described in claim 2, wherein said one end of said thimble is beveled to form an annular V-shaped channel at said shoulder.

4. A quick disconnect device, as described in claim 3, wherein the actuator is beveled at said other end for radially engaging the tube.

5. A quick disconnect device, as described in claim 1, wherein said one end of said thimble is beveled.

6. A quick disconnect device, as described in claim 1, wherein the actuator is beveled at said other end for radially engaging the tube.

7. In combination with a valve having a tubular body, an annular valve seat, and a poppet valve normally seated on said seat, a quick disconnect device for connecting the end of a flexible tube into the valve comprising an annular actuator inserted into the end of said tube and having a stem for engaging said poppet valve, an outer sleeve screwed axially onto said valve body and having an inner annular recess terminating in a shoulder, a thimble within said recess having one end forming an annular channel at said shoulder, and an O-ring surrounding said tube behind the other end of said actuator fitting within said channel and adapted to constrict said tube when the sleeve is tightened to force the actuator against the valve poppet and to permit withdrawal of said tube when the sleeve is loosened.

8. The combination, as described in claim 7, wherein the actuator is beveled at said other end.

9. The combination, as described in claim 7, wherein said recess shoulder is tapered.

10. The combination, as described in claim 9, wherein said one end of said thimble is tapered to form an annular V-shaped channel at said shoulder.

11. The combination, as described in claim 10, wherein the actuator is beveled at said other end.

12. The combination, as described in claim 7, wherein said one end of said thimble is tapered.

* * * * *